United States Patent
Koerner

[15] 3,691,091
[45] Sept. 12, 1972

[54] DEFOAMING EMULSION
[72] Inventor: Götz Koerner, Essen, Germany
[73] Assignee: Th. Goldschmidt AG, Essen, Germany
[22] Filed: Feb. 10, 1970
[21] Appl. No.: 10,281

[30] Foreign Application Priority Data

March 22, 1969 Germany..........P 19 14 684.0

[52] U.S. Cl.....................................252/358, 252/321
[51] Int. Cl. ..............................................B01d 17/00
[58] Field of Search...............................252/358, 321

[56] References Cited

UNITED STATES PATENTS 3,455,839   7/1969   Rauner.......................252/321

FOREIGN PATENTS OR APPLICATIONS 1,067,003   3/1960   Germany....................252/321

Primary Examiner—John D. Welsh
Attorney—McGlew and Toren

[57] ABSTRACT

The defoaming activity of an aqueous defoaming emulsion containing an emulsifier, silica in fine particle form and methylpolysiloxanes is increased by incorporating into the emulsion 10 to 60 percent by weight, calculated on the total amount of siloxane in the emulsion, of organosilicon compounds of the general formula:

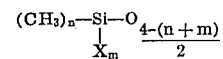

wherein X stands for -OR, R being hydrogen or alkyl of one to four carbon atoms, $n$ has a value of 1.8 to 2.0 and $m$ has a value from 0.02 to 0.33.

1 Claim, No Drawings

DEFOAMING EMULSION

FIELD OF THE INVENTION

The invention relates to defoaming emulsions which comprise water, emulsifier, methylpolysiloxane and silica in fine particle form.

BACKGROUND INFORMATION AND PRIOR ART

German patent 1,067,003 discloses a defoaming emulsion which essentially consists of water, emulsifier, methylpolysiloxane and silica in fine particle form. The silicone oil of the emulsion composition of this German patent is a predominantly linear dimethylpolysiloxane with terminal trimethylsiloxy groups. A typical formulation for a prior art defoaming emulsion of this nature is as follows:

54.2 parts by weight of water
30.0 parts by weight of methylpolysiloxane
1.5 parts by weight of silicaaerogel
6 parts by weight of polyethyleneglycol-monostearate, and
8.3 parts by weight of sorbitemonostearate These known emulsions, however, are not fully satisfactory in respect to their defoaming effect and primarily in regard to their stability. Another well known disadvantage of the known emulsions is that they have a relatively high viscosity and thus are not sufficiently flowable. This disadvantage is particularly pronounced if the emulsion has a relatively high concentration, for example if the concentration is 30 to 50 percent of aerosil enriched methylsiliconeoils. The impaired flowability of the emulsions makes it difficult to supply them in exact dosages and dilution of the emulsions is not always feasible or in any event connected with considerable difficulties. For these reasons such prior art emulsions are frequently not suitable as defoamers in aqueous systems.

SUMMARY OF THE INVENTION

It is a primary object of the present invention to provide a defoaming emulsion, to wit an emulsion capable of destroying foam, which overcomes the disadvantages of the prior art emulsion formulations and which exhibits superior defoaming activity.

It is also an object of the invention to provide defoaming emulsions of the indicated kind which have satisfactory flowability and stability characteristics and are suitable for destroying foams in aqueous systems.

Generally it is an object of the invention to improve on the art of defoaming emulsions as presently practiced.

Briefly and in accordance with this invention it has surprisingly been found that the defoaming activity of the prior art defoaming emulsions is significantly improved if the emulsion is admixed with certain predetermined organosilicon compounds.

It has thus been ascertained that emulsions of the indicated kind are imparted with superior characteristics if the emulsion contains 10 to 60 percent by weight, calculated on the total amount of siloxane in the emulsion, of compounds of the general formula:

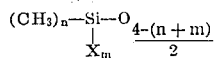
I wherein X stands for the group —OR in which R is hydrogen or alkyl of one to four carbon atoms, $n$ has a value of from 1.8 to 2.0 and $m$ has a value of 0.02 to 0.33.

The stability of the emulsion is significantly increased by the addition of the compounds of formula I above. Moreover, the defoaming action of the emulsion is considerably improved. Emulsions of high concentrations remain flowable and can be readily diluted with water. Furthermore, a wide variety of emulsifiers may be used in the emulsions while, by contrast, in the prior art emulsions the choice of emulsifiers is relatively restricted.

Examples of organosilicon compounds to be incorporated in the emulsion system and being embraced by formula I above are for example compounds of the formula

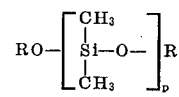
II wherein R has the above meaning and $p$ has a value of 10 to 100.

Another example of suitable compounds embraced by the general formula are the compounds of formula

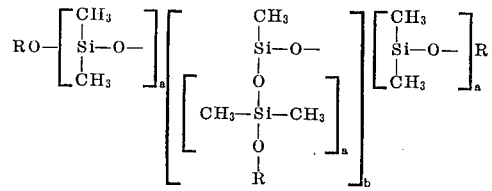

wherein $a$ has a value of 1 to 10, $b$ has a value of from 0.5 to 10 and $(2a+ab/b) \geq 4$.

Moreover, compounds of the formula

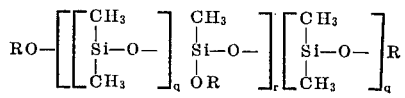
IV are suitable for the inventive purpose. In the compounds of formula IV, $q$ has a value of from 4 to 15 and $r$ has a value of from 1 to 50.

It should be stated in this context that it was certainly surprising that the presence of the indicated compounds does in fact improve the characteristics and properties of the defoaming emulsions since the compounds proper exhibit very slight defoaming activity only.

The inventive defoaming emulsion may for example have the following general composition:
  10 to 55 percent by weight of oily phase
  30 to 88.5 percent by weight of water, and
  1.5 to 20 percent by weight of emulsifier or emulsifier mixture.

The oily phase may then have the following composition:
  3 to 10 percent by weight of silica in finely distributed form (preferably pyrogenic silica) and
  90 to 97 percent by weight of siloxane mixture consisting of
    a. 10 to 60 percent by weight of a siloxane in accordance with the invention and corresponding to formula I, and b. 40 to 90 percent by weight of a polydimethylsiloxane which is endblocked with trimethylsiloxy groups. The polydimethylsiloxane should have a viscosity of 50 to 5,000 cP, preferably 100 to 500 cP.

The emulsifier mixture consists advantageously of a hydrophobic and a hydrophilic component. Thus the HLB-value of the first component may be smaller than 6, while the HLB-value of the second component may be greater than 12. Suitable hydrophobic emulsifiers are carboxylic acid esters or fatty acid esters of multivalent alcohols as, for example, the stearic acid ester of glycols, glycerine or sorbite as well as higher fatty alcohols or the addition products of a few moles ethyleneoxide to these fatty alcohols, fatty acids or similar compounds with active hydrogen atoms.

In respect to the hydrophilic emulsifiers, the addition products of larger amounts of ethyleneoxide to the aforementioned products are suitable. Thus, for example, the addition products of 10 to 100 moles of ethyleneoxide to fatty alcohols are suitable. However, anionactive emulsifiers, such as sodiumlaurylsulphate or sodiumdodecylbenzenesulphonate are also suitable for the indicated purpose.

The invention will now be described by several examples it being understood, however, that these examples are given by way of illustration and not by way of limitation and that many changes may be effected without affecting in any way the scope and spirit of the appended claims.

The examples disclose the preparation and properties of the emulsions and also include comparison of the properties with those of known emulsions.

EXAMPLE I

Defoaming emulsions composed of 10 percent by weight of oily phase and 2 percent by weight of an emulsifier mixture of an HLB-value of 4.9 were prepared. The composition of the oily phase is indicated in the following Table I. The emulsifier mixture consisted of fatty alcohols or their polyethyleneglycolethers.

The defoaming or foam destroying activity was tested with a 0.1 percent aqueous solution of a mixture of sodiumdodecylebenzenesulphonate and polyethyleneglycolfattyalcoholether. For this purpose, 6 liter of oil-free air per minute were conducted through 1,000 ml of the tenside solution at 20°C. This was performed in a 2 liter measuring cylinder by means of a glass frit having the porosity 1. A foam was formed in this manner. When the foam had reached a volume of 1 liter, the air supply was interrupted by removal of the frit from the measuring cylinder. 2.5 ml of the defoaming emulsion which had previously been diluted with water in the ratio 1:4 were then added. This corresponds to 50 ppm (parts per million) of oily phase. The dilution of the defoaming emulsion was effected with cold distilled water by adding the water in portions.

After the complete destruction of the foam, air was again passed through the system and the volume of the reformed foam was measured. The measurements were carried out after 1, 3, 5, 10 and 30 minutes. Furthermore, the time period was ascertained which was necessary for again forming a foam volume of 1 liter.

The numerical values obtained as a result of the tests are tabulated in Table I.

The table clearly indicates that the emulsion prepared in accordance with the invention has a superior defoaming action if compared with the defoaming action of the emulsions devoid of the inventive addition of compounds of formula I. The table furthermore indicates that the stability of the inventive emulsion is improved.

TABLE I

| siloxane of the formula III $a=6/b=3/$ $R=C_2H_5$ % | methyl-silicone oil 1000 cP % | aerosil % | Defoaming Action 1 min. | 3 min. | 5 min. | 10 min. | 30 min. | 1000 ml | emulsion-stability |
|---|---|---|---|---|---|---|---|---|---|
| — | 95 | 5 | 130 | 40 | 20 | 30 | — | 20 min. | unstable |
| 10 | 85 | 5 | 20 | 30 | 30 | 20 | 570 | | unstable |
| 17.5 | 77.5 | 5 | 20 | 20 | 50 | 50 | 530 | | stable |
| 27.5 | 67.5 | 5 | 20 | 20 | 60 | 60 | 330 | | stable |
| 37.5 | 57.5 | 5 | 20 | 20 | 20 | 30 | 270 | | stable |
| 47.5 | 47.5 | 5 | 20 | 20 | 20 | 40 | 340 | | stable |
| 57.5 | 37.5 | 5 | 20 | 20 | 20 | 20 | 340 | | stable |
| 67.5 | 27.5 | 5 | 20 | 20 | | 50 | 360 | | stable |
| 77.5 | 17.5 | 5 | 20 | 20 | 20 | 60 | | 26 min. | stable |
| 85.0 | 10.0 | 5 | 20 | 20 | 30 | 60 | | 27 min. | stable |
| 95.0 | — | 5 | 20 | 20 | 20 | 320 | | 21.5 min. | stable |

EXAMPLE 2

Defoaming emulsions were prepared containing 50 percent by weight of oily phase and 14 percent by weight of an emulsifier mixture. The active substance has the following composition:

a.
   46.25 percent by weight of methylsilicone oil 100 cP 46.25 percent by weight of methylsilicone oil 1,000 cP 7.5 percent by weight of finely distributed pyrogenic silica b.
   37 percent by weight of methylsilicone oil 100 cP 37 percent by weight of methylsilicone oil 1,000 cP 6 percent by weight of finely distributed pyrogenic silica 20 percent by weight of a siloxane of formula III wherein $$a=6, b=2, R=H.$$

It will thus be noted that the formulation (a) above did not contain one of the inventive compounds.

A mixture of polyethyleneglycolmonostearate and glycerinemonostearate with an HLB-value of 12 was used for emulsifying purposes.

The emulsion obtained according to (a) above is no longer flowable and cannot be diluted with water. Moreover, it does not exhibit any defoaming action. By contrast, the emulsion obtained pursuant to (b) above has a high defoaming activity and good flowability characteristics. The emulsion (b) can be readily diluted with water and can be directly used for defoaming without prior dilution with water.

What is claimed is:

1. A defoaming emulsion consisting essentially of 10 to 55 percent by weight of an oily phase, 30 to 88.5 percent by weight of water and 1.5 to 20% by weight of emulsifier or emulsifier mixture, said oily phase essentially consisting of 3 to 10 percent by weight of silica in fine particle form and 90 to 97 percent by weight of a siloxane mixture, said siloxane mixture in turn essentially consisting of 10 to 60 percent of an organosilicon compound of the general formula:

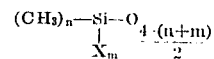

wherein X stands for —OR in which R is hydrogen or alkyl of one to four carbon atoms, $n$ has a value of from 1.8 to 2.0 and $m$ has a value of from 0.02 to 0.33, and 40 to 90 percent by weight of polydimethylsiloxane endblocked with trimethylsiloxy groups and having a viscosity of between about 50 to 5,000 cP.

* * * * *